US009994237B2

(12) United States Patent
Jestin et al.

(10) Patent No.: US 9,994,237 B2
(45) Date of Patent: Jun. 12, 2018

(54) ELECTRICAL VEHICLE AND ASSOCIATED TRANSPORT FACILITY

(71) Applicant: Blue Solutions, Ergue Gaberic (FR)

(72) Inventors: Jean-Jacques Jestin, Fouesnant (FR); Christian Sellin, Concarneau (FR); Yvon Le Paven, Ergue Gaberic (FR)

(73) Assignee: BLUE SOLUTIONS, Ergue Gaberic (FR)

( * ) Notice: Subject to any disclaimer, the term of this patent is extended or adjusted under 35 U.S.C. 154(b) by 129 days.

(21) Appl. No.: 14/902,794

(22) PCT Filed: Jun. 19, 2014

(86) PCT No.: PCT/EP2014/062926
§ 371 (c)(1),
(2) Date: Jan. 4, 2016

(87) PCT Pub. No.: WO2015/000713
PCT Pub. Date: Jan. 8, 2015

(65) Prior Publication Data
US 2016/0167678 A1      Jun. 16, 2016

(30) Foreign Application Priority Data

Jul. 5, 2013   (FR) .................................... 13 56638

(51) Int. Cl.
*H02J 7/00*        (2006.01)
*B61C 17/06*     (2006.01)
(Continued)

(52) U.S. Cl.
CPC ................ *B61C 17/06* (2013.01); *B60L 3/04* (2013.01); *B60L 11/005* (2013.01);
(Continued)

(58) Field of Classification Search
CPC ................ B60L 11/005; B60L 11/1816; B60L 11/1824; B60L 11/1805; B60L 11/1811;
(Continued)

(56) References Cited

U.S. PATENT DOCUMENTS

2003/0057003 A1    3/2003   Kawada et al.
2008/0277173 A1*  11/2008   Midrouillet ......... B60L 11/1816
                                                            180/65.1
(Continued)

FOREIGN PATENT DOCUMENTS

CN      101292408 A    10/2008
CN      202624222 U    12/2012
(Continued)

OTHER PUBLICATIONS

French Search Report dated Mar. 21, 2014, French Application No. 1356638.

*Primary Examiner* — Drew A Dunn
*Assistant Examiner* — Michael DiBenedetto
(74) *Attorney, Agent, or Firm* — Womble Bond Dickinson (US) LLP

(57) ABSTRACT

The invention relates to an electrical vehicle (100), including an electric engine (102) and on-board energy storage means (104, 106) that are electrically connected to the engine in order to supply same with electrical energy, in which the energy storage means include a first energy storage module (104) including at least one supercapacitor, and a second energy storage module (106) including at least one battery, the first and the second energy storage modules (104,106) being arranged on parallel electrical branches, the vehicle including interconnection means (108), arranged between the energy storage means (104, 106) and the engine (102), capable of electrically connecting the two electrical arms to the engine (102) and configured such that a single one of the two electrical arms is connected to the engine
(Continued)

US 9,994,237 B2

Page 2

Figure 1:
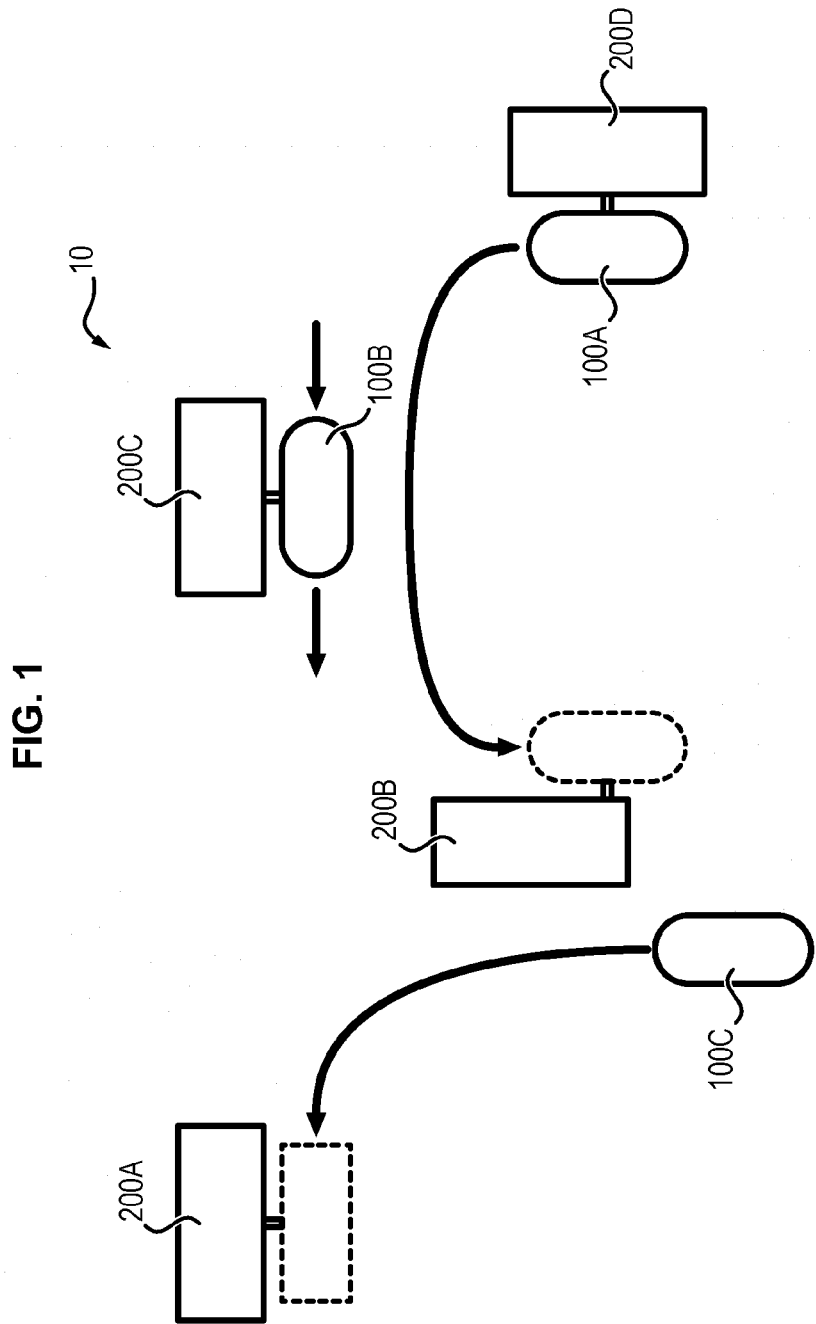

(102) at a time. The invention also relates to a facility comprising the vehicle (100) and at least one station (200) for recharging the vehicle.

30 Claims, 2 Drawing Sheets

(51) Int. Cl.
*B60L 3/04* (2006.01)
*B60L 11/00* (2006.01)
*B60L 11/18* (2006.01)
*B60M 7/00* (2006.01)

(52) U.S. Cl.
CPC ......... *B60L 11/1805* (2013.01); *B60L 11/185* (2013.01); *B60L 11/1811* (2013.01); *B60L 11/1816* (2013.01); *B60L 11/1824* (2013.01); *B60L 11/1861* (2013.01); *B60M 7/003* (2013.01); *B60L 2210/10* (2013.01); *B60L 2210/30* (2013.01); *B60L 2230/30* (2013.01); *B60L 2230/32* (2013.01); *B60L 2240/12* (2013.01); *B60L 2250/12* (2013.01); *Y02T 10/705* (2013.01); *Y02T 10/7005* (2013.01); *Y02T 10/7022* (2013.01); *Y02T 10/7044* (2013.01); *Y02T 10/7088* (2013.01); *Y02T 10/7216* (2013.01); *Y02T 10/7241* (2013.01); *Y02T 90/121* (2013.01); *Y02T 90/127* (2013.01); *Y02T 90/128* (2013.01); *Y02T 90/14* (2013.01)

(58) Field of Classification Search
CPC .... B60L 11/1818; B61C 17/06; B60M 7/003; H02J 7/0003; H02J 7/0024; H02J 7/0027; H02J 7/34; H02J 7/345; H02J 7/0042; H02J 7/0055
USPC .................. 320/104, 109, 166, 167; 307/46
See application file for complete search history.

(56) References Cited

U.S. PATENT DOCUMENTS

| | | | |
|---|---|---|---|
| 2009/0272587 A1* | 11/2009 | Ippolito | B60L 5/42 180/65.1 |
| 2012/0038215 A1* | 2/2012 | Berry | B60L 11/005 307/77 |
| 2013/0106187 A1 | 5/2013 | Gemin et al. | |
| 2013/0152474 A1* | 6/2013 | Yamamaru | B60L 11/1818 49/246 |
| 2014/0319907 A1* | 10/2014 | Yamazaki | B60K 1/04 307/9.1 |
| 2015/0137751 A1* | 5/2015 | King | B60L 11/1818 320/109 |

FOREIGN PATENT DOCUMENTS

| | | |
|---|---|---|
| CN | 202817872 U | 3/2013 |
| CN | 103085675 A | 5/2013 |
| EP | 2574493 | 4/2013 |
| JP | H 06086407 A | 3/1994 |
| JP | 2004221521 A | 8/2004 |
| JP | 2005269828 A | 9/2005 |
| RU | 63297 U1 | 5/2007 |
| WO | WO-2011139680 | 11/2011 |
| WO | WO-2012154990 | 11/2012 |

* cited by examiner

ELECTRICAL VEHICLE AND ASSOCIATED TRANSPORT FACILITY

The invention relates to a public transport facility, notably comprising a vehicle intended for transporting passengers and stations at which this vehicle is supposed to stop, as well as to the vehicle of said facility.

In the state of the art, a facility is known comprising a vehicle of the tramway type, comprising an electric motor powered by supercapacitors, the vehicle regularly stopping in stations provided for this purpose in order to take or deposit passengers, the supercapacitors being recharged during this stop by means of a connection of the vehicle with the station. The supercapacitors may be recharged very rapidly, the duration of the stop of the vehicle for taking or depositing passengers is generally sufficient for recharging the supercapacitors found in the vehicle so that the latter may move to the next stop on its travel.

Such a facility is very advantageous since it gives the possibility of designing an electric collective transport vehicle but which may continuously circulate during the whole of the day without having any need to be recharged for many hours during the latter.

However, a facility of this type requires the building of stopping and charging stations connected to the electricity network and relatively imposing, notably when these stations comprise means for storing electrical energy such as supercapacitors which provide relief to the electricity network. These stations are therefore generally cumbersome which makes them not very aesthetical. Consequently they cannot be installed everywhere which may generate constraints relatively to the travel of the vehicles. Such a facility may therefore not be adapted to every case.

The object of the present invention is to provide an electrical vehicle and a public transport facility which meets this problem, i.e. notably gives the possibility of making available a collective transport service for which the implementation constraints are not very significant.

For this purpose, the object of the invention is first of all an electrical vehicle, comprising an electric motor and on board energy storage means electrically connected to the motor in order to supply electric energy to the motor, wherein the energy storage means comprise:
- a first energy storage module comprising at least one supercapacitor, on the one hand,
- a second energy storage module comprising at least one battery, on the other hand, the first and second energy storage modules being laid out on parallel electric branches, the vehicle comprising interconnection means positioned between the energy storage means and the motor capable of electrically connecting both electric branches to the motor and configured so that only one of the two electric branches at a time is connected to the motor.

It will be recalled that the battery and the supercapacitor are energy storage means each consisting of two electrodes and of an electrolyte allowing circulation of ions and electrons between both electrodes. But their composition, their operation and their applications are quite different.

The electrodes of a supercapacitor are made on the basis of active coal and are generally (but not necessarily) identical. They allow accumulation of ions or electrons respectively on each of its electrodes and storage of energy in a capacitive way. The batteries are designed on the basis of a negative metal electrode (anode), notably in lithium, and on a positive electrode (cathode), notably formed with a plastic composite giving the possibility of inserting metal ions. An oxidation reaction occurs at the anode and another reduction one at the cathode. The type of storage which the battery allows is Faradic storage. The battery preferentially used in the invention is a battery of the lithium metal-polymer type.

A supercapacitor has a large power density which means that it may be charged very rapidly, with strong currents, and that the energy which it contains may be rapidly given back. A battery on the one hand comprises better energy density, i.e. it may keep energy for a much longer time than a supercapacitor, and store a much larger amount thereof. Even if a charging of a battery is therefore much slower than charging a supercapacitor, a battery generally gives the possibility of covering a much larger distance.

Thus, by means of the invention, the vehicle may operate under "rapid recharging in a station" conditions like in the state of the art, because of the supercapacitors which it contains, as well as independently of the stations by means of its onboard battery. The battery actually allows the vehicle to cover a much larger path between two charging operations than the length of the path allowed by the supercapacitors alone, notably several tens of kilometers. The energy stored in the battery is also available for several tens of hours.

By this association, it is therefore possible to adapt the energy storage means by which the energy is provided to the motor, to the circumstances. When one is in areas in which the space required for the installation of the stations is available and/or when it is considered that the stations do not distort the architectural ensemble, for example in a pen-urban area, stations are installed and the electric vehicle powers the motor by means of the regularly recharged supercapacitors at the station. On the other hand, when the selected area for circulation of the vehicle does not allow installation of stations, for reasons of congestion or preservation of the urban landscape, for example in a historical city centre, charging stations are not installed and the vehicle circulates by means of its battery on this portion of its travel.

This diversity of electric storage means also gives the possibility of confronting different contingencies, such as traffic jams which increase the travel time of the vehicle between two stations or works located on the usual path of the vehicle which force deviation of the path of the vehicle of one station for a given period of time. Over-dimensioning of the supercapacitors is thus also avoided, which was carried out in the state of the art in order to take into account a few cases in which such perturbations occurred.

By connecting the battery and the supercapacitors each directly to the electric motor, it is possible to have a better yield of the vehicle. Indeed, a charging/discharging step is avoided, which would have been necessary for example if the battery was connected in series to the supercapacitors and that it would exclusively allow supplying energy to the supercapacitors and/or vice versa, such a step may generate an energy loss.

By the fact that it is not possible to power the motor both with the supercapacitors and the battery it is possible to better control the energy expenditures of the vehicle, while avoiding to provide the latter with significant available power which would not be really necessary for proper operation of the vehicle.

It will be noted that the interconnection means positioned between the storage means and the motor may of course be placed in the module comprising the energy storage means, such a module also including onboard electronics. This is also valid for other elements described here.

The vehicle may also comprise other optional features which are mentioned below.

The vehicle may further comprise:
- first connection means, able to connect the first storage module to additional connection means, located outside the vehicle, second connection means distinct from the first, able to connect the second storage module to other additional connection means located outside the vehicle.

The supercapacitors (respectively the batteries) are thus charged each independently, which guarantees the setting into place of a type of charging adapted to different energy storage means, and thus optimal use of the energy transfer to the vehicle. This also optionally allows simultaneous charging of both energy storage modules.

The first connection means may comprise a connection arm, notably a telescopic arm, able to extend protruding from the vehicle and comprising a connector at its end intended to be connected to an additional connector notably of a charging station. Such an arm is preferably located in the upper portion of the vehicle so as not to be accessible to a user. This connection is actually intended to be achieved in an automated way. Other types of connection means may however be used, for example means of the pantograph type.

The second connection means may comprise a connector, of the male or preferentially female type, located in a trap door with lockable access of the vehicle. This trap door is generally located at a height accessible to the user, who should himself/herself connect the connector to the additional connector optionally located in a charging station.

The vehicle may also comprise at least one DC/DC current converter and/or an AC/DC converter interposed between the first and/or second connection means and the corresponding storage module. Such means give the possibility of adapting the energy received from the outside, notably from a DC current energy source such as energy storage means, or an AC current source such as an urban electricity network, to the specific needs of the relevant storage means.

Between the battery and the connection means for charging said battery, the vehicle preferably comprises a charger which forms both a DC current converter and an AC-DC converter. It is thus possible to recharge the battery, either from an urban electric network, or via charging terminals including integrated energy storage means, and this without having to specifically adapt these charging terminals to said vehicle. The vehicle may thus be compatible with the numerous charging facilities.

The interconnection means preferably comprise a switch comprising a plurality of positions, one of the positions notably allowing electrical connection between the first storage module and the motor while another of the positions allows electrical connection between the second storage module and the motor. It will be noted that the switch may also optionally comprise at least one third position, a so called stop position, in which none of the energy storage modules is connected to the motor.

The vehicle may also comprise means for controlling the interconnection means, able to control the interconnection means depending on one or several of the following parameters:
 parameters related to the operation of the first and/or of the second energy storage module, notably the state of charge,
 parameters related to the operation of the vehicle, notably the speed of the vehicle or the state of the motor,
 a signal from a user interface.

The means for controlling the interconnection means are able to communicate with one or several of the following elements:
 means for monitoring the first storage module,
 means for monitoring the second storage module,
 means for monitoring the other units of the vehicle, notably the CAN bus of the vehicle.

The monitoring means give the possibility of obtaining parameters related to the storage modules (charge state, operating fault) and the CAN bus collects all the information from the units of the vehicle (in particular measured at these units by means of sensors). It notably gives the possibility of obtaining information on the state of the motor, on the speed of the vehicle, on the controlled past via the user interface.

The interconnection means may therefore be notably controlled according to the charge level of the supercapacitor(s). If the charge level is less than a predetermined value, the interconnection means are controlled so that the position of the interconnection means allows the battery to be connected to the motor. On the contrary, it may also be provided that when the charge level of the supercapacitor(s) exceeds a second predetermined value, the position of the interconnection means is controlled in order to electrically connect the supercapacitors to the motor. This control mode is particularly adapted since the supercapacitors do not keep the stored energy for a very long time. Therefore, the energy obtained via the supercapacitor(s) is consumed first as soon as possible, and when the latter no longer allow powering of the motor properly, obtaining the energy for powering the motor is sought via the battery.

The interconnection means may of course also be controlled by means of a user interface and/or by means of other parameters related to the operation of the vehicle (speed or on/off condition of the motor notably) and/or to that of the battery. For example it is thus possible to pass into a non-conventional operating mode if required by the circumstances (notably if an operating fault of one of the storage modules is detected). It is also possible if necessary to envision positioning of the interconnection means in a stop position at a standstill of the motor.

The vehicle may comprise a DC/DC converter, interposed between the motor and at least one of the energy storage modules, notably between the interconnection means and the motor. In order to limit the number of elements in the vehicle, a converter may notably be placed at the output of the interconnection means since the electric energy does not arrive from both electric branches (and therefore in two non-similar forms) simultaneously. However, it may also be contemplated that at least one, notably each electric branch comprises a converter interposed between the storage means and the interconnection means.

Said or at least one of the DC converters (or chopper) may operate like a speed controller, the vehicle also comprising means for controlling the controller, controlling the controller according to at least one parameter from the following list:
 parameters related to the operation of the first and/or of the second energy storage module, notably the charge state,
 parameters related to the operation of the vehicle, notably the speed of the vehicle or the state of the motor,
 a signal from a user interface.

The means for controlling the controller may notably be capable of communicating with one or several of the following elements:
 the means for monitoring the first storage module,
 the means for monitoring the second storage module,
 the means for monitoring the other units of the vehicle, notably the CAN bus of the vehicle.

The voltage ascribed to the motor may notably depend on a signal relating to the acceleration pedal, and optionally to other elements such as the means for measuring the condition of the supercapacitors and of the batteries, a clock, etc. Notably it may contemplated that the control means be provided for limiting the output voltage of the controller when it is the battery which is connected to the motor, and/or when the charge level of the storage means connected to the motor is less than a threshold level, and/or when an anomaly is detected relating to one of the storage means, notably the one connected to the motor, in order not to use the energy by unnecessarily increasing the speed.

The energy storage means are preferably positioned in the roof of the electric vehicle. This is of particular interest when the first connection means are placed in the upper portion of the vehicle for reducing the distance to be covered between the station and the supercapacitors, and to thereby increase the yield of the energy storage. Preferably, they are positioned in a roof box of the vehicle, notably added onto the vehicle. It is thus possible to carry out more efficient maintenance of the energy storage portion of the vehicle.

The vehicle may of course recover energy upon braking. The motor operates like a generator during braking phases and allows recharging of the energy storage means with which it is connected at the moment of the recovery. As this is known, the vehicle may of course comprise an additional frictional braking system, the energy being also possibly recovered from this additional braking system.

Preferably, the first energy storage module comprises at least one pack comprising a plurality of supercapacitors in series, notably two identical packs in parallel.

The battery may comprise cells (notably 6) connected in series and each consisting of a plurality of positive and negative electrodes in parallel.

The configurations of the supercapacitors and of the batteries may of course be different from what was described provided that the associations of the different elements give the possibility of satisfying the conditions of use of the vehicle, notably in terms of voltage and storage capacity.

The vehicle is notably a collective transport vehicle, having a large capacity. It may notably be mounted on tires like a bus or on rails like a tramway.

The object of the present invention is also a transport facility, comprising:
- at least one vehicle as described above, comprising connection means, so called first connection means, for connection of the first storage module to a source outside the vehicle, and
- at least one station for recharging the vehicle positioned on a path of the vehicle and in the vicinity of which the vehicle is intended to stop, connected to at least one source of energy and including a third connection means mating the first connection means of the vehicle, and capable to connect said or one of the energy sources to the first storage module.

The energy source is first an urban electricity distribution network. Alternatively, or additionally, said or at least one of the stations may be connected to an autonomous energy source, notably obtained from a clean renewable energy (solar energy or wind energy for example). Photovoltaic panels are particularly suitable. They give the possibility of obtaining electric energy from photons from solar radiation and consequently are particularly suitable for highly sunny areas or in which it is difficult to build an access to the electricity distribution network. The panels may then be placed on the roof of the station or may be positioned at a distance from the station.

In an embodiment, the first means for connecting the vehicle comprise a arm, notably telescopic and able to extend while protruding from the vehicle and comprising a connector at its end, the third connection means comprising a connector mating the one located at the end of the arm and positioned at the station so that both connectors of the station and of the vehicle may come into contact, when the vehicle stops at the station.

Said or at least one of the stations may also comprise energy storage means comprising at least one third storage module comprising one or several supercapacitors electrically connected to said or at least one of the energy sources on the one hand and to the third connecting means on the other hand. This or these supercapacitor(s) give the possibility of better regulating electricity from the electricity distribution network. Thus, instead of making a considerable energy request to the network within a limited time corresponding to the stopping time of the vehicle in the station, said supercapacitor(s) of the station is (are) charged between the passing of two vehicles at a relatively low speed, placing a lesser load on the electric network, and then the supercapacitor(s) of the station very rapidly give back the energy to the vehicle, since this type of storage means may be discharged very rapidly.

Said or at least one of the stations comprises at least one direct current/direct current (DC/DC) converter interposed between the third storage module and the third connection means.

Said or at least one of the stations is electrically connected to an urban distribution network forming said or one of the energy sources, and comprises an alternating current/direct current (AC/DC) converter interposed between the network and the third connection means, notably between the network and the third storage module. The energy is actually stored by the storage means (onboard or located in the station) in a direct form, while the energy circulates on the distribution network in an alternating form. A direct current converter may also be interposed between each energy source, notably the distribution network and the third storage module.

Said or at least one of the stations may also comprise fourth connection means, mating the second connection means of the vehicle, able to connect said or one of the energy sources to the second storage module. These fourth connection means are distinct from the third connection means.

It will also be noted that, if a station is connected to an autonomous energy source, said station then preferably also comprises a fourth storage module including at least one battery electrically connected to the autonomous energy source in order to store the energy from this source. This fourth storage module may power the third storage module and/or directly the third and/or the fourth connection means. One or several converters may also be interposed between the energy source and the fourth storage module or the fourth module and the connection means with which it is electrically connected. It will be noted that the fourth module is particularly suitable for powering fourth connection means, since the time for loading this fourth module is relatively long and therefore may not provide much energy to the first module during the stop at the station.

Figure 2:
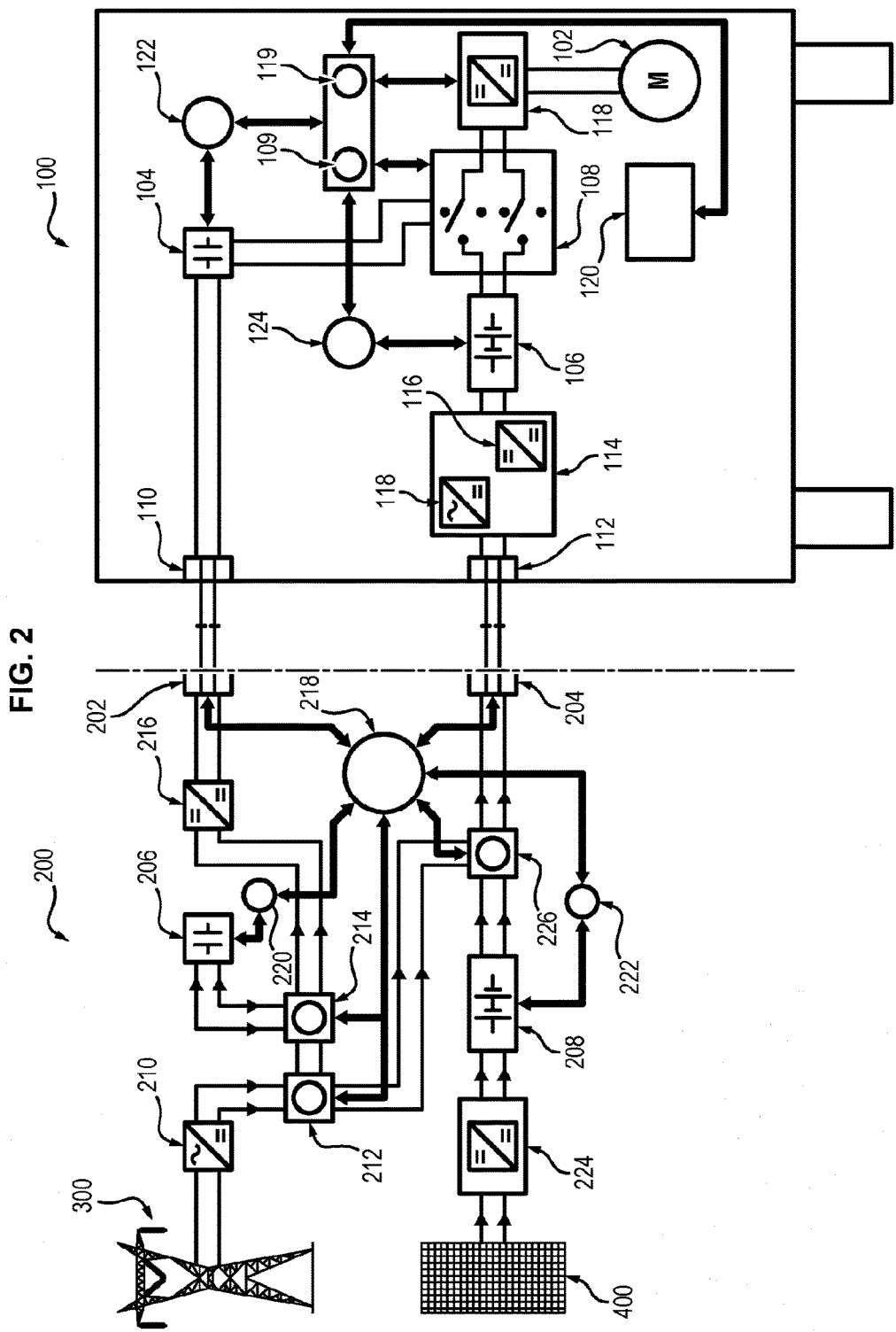

A vehicle and a facility will now be described according to an embodiment of the invention, with reference to the enclosed drawings, which are only given as an example and do not delimit themselves the scope of the invention, wherein are shown:

FIG. 1 schematically illustrating the principle of a facility according to the invention, FIG. 2 schematically illustrating the electric diagram of a vehicle and of the associated station.

A facility 10 according to a particular embodiment of the invention is described in FIG. 1, comprising a plurality of vehicles 100A-100C circulating in an urban area, in the present case on distinct paths, and stations 200A-200D placed on the paths of the different vehicles, these stations form stopping stations for the vehicles, at which the passengers of the vehicle may request getting on the vehicle or getting down from the vehicle. These stations also form a charging station for the vehicle, at which the latter may recharge the energy storage means which it has on board. For this, it connects to the station when it stops at the latter, as this is schematically illustrated in the case of the vehicle 100A (with the station 200D) and of the vehicle 1006 (with the station 200C).

The vehicle is configured so that it is not necessary that it stops at each station. In the case illustrated in the figures, for example, the vehicle 100A stops at the station 200D and then passes without stopping in front of the station 200C, notably because none of the passengers of the vehicle has requested stopping, and will again stop at the station 200B.

The vehicle may be a bus which circulates on tires or circulating on pre-positioned rails on the public track. Regardless of its motion method, the vehicle circulates autonomously, by means of the loaded energy, between the stations.

Now that the principle of the invention has been generally explained, the architecture of a vehicle 100 and of a charging station 200 will now be described in more details, by means of FIG. 2, such as they belong to the facility according to an embodiment of the invention. In this figure, the power electronics type connections are illustrated in a thin solid line, while the connections of the type intended for communication between the elements are illustrated by means of a double arrow.

The vehicle 100 according to this embodiment comprises, as this is seen in FIG. 2, an electric motor 102 powered by first energy storage means 104 on the one hand, comprising one or several supercapacitor modules, and by second storage means 106, on the other hand, forming a battery such as a lithium metal-polymer battery, including a solid electrolyte. It is recalled that supercapacitors may be charged and discharged very rapidly and thus give the possibility of providing a large amounts of energy over a very short time. As for the batteries, they do not give the possibility of being charged as rapidly but may keep the stored energy for a much longer time and in a larger amount than a supercapacitor.

The vehicle thus provided with these two energy storage means may circulate for many hours in an environment comprising close stations without having to stop for more than a few seconds at each time for recharging the energy storage means (by means of its supercapacitor module). On the other hand, when one arrives in an area in which stations cannot be implanted, for example in a town center, because of space and esthetical constraints, the vehicle may circulate on a short portion of its path by means of its battery 106. The latter obviously has to be recharged but as it is not used intensively, the vehicle may only stop for recharging much more rarely than a vehicle only comprising a battery as energy storage means.

The vehicle also comprises interconnection means 108 connected (at the output) to the motor 102 on the one hand and, to the supercapacitor module 104 and to the battery 106 on the other hand (at the input). More specifically, the interconnection means comprise a switch configured for having a first position connecting the supercapacitor module 104 to the motor 102 and a second position connecting the battery 106 to the motor 102. The switch is more particularly configured so as not to allow both connections of the supercapacitor module 104 and of the battery 106 to the motor 102. In other words, the electric connections of the supercapacitor module 104 and of the battery 106 to the motor are mutually exclusive. The switch also comprises, as illustrated in FIG. 2, a third position in which neither the supercapacitor module 104 nor the battery 106 is connected to the motor. This position is of course reserved to a mode in which the vehicle is at a standstill, its motor not being powered when the switching means 108 are placed in this position. This is of course optional. A condition in which the motor is not connected to any of the storage means may also be attained by means of other elements of the vehicle, for example by means of the variable speed drive, described hereafter.

The interconnection means 108 are able to communicate with control means 109 controlling the change in position of the switch according to parameters received from other elements of the vehicle, as this will be commented later on.

The supercapacitor module 104 and the battery 106 are both able to be connected to external charging means via connection means, respectively the first connection means 110 and second connection means 112, giving the possibility of electrically connecting each of the energy storage means 104, 106 to an external circuit. The supercapacitors are notably charged via the stations, regularly during the travel of the vehicle, as this was described above, while the battery 106 is charged when the vehicle stops for a long time. The station described in the embodiment of FIG. 2 comprises means for connecting to the first and second connection means 110, 112 but it is not mandatory that it comprises means able to be connected to the second connection means 112 allowing charging of the battery.

Preferably, the first connection means 110 comprise a connector located at the end of a movable connection arm and notably retractable and the second connecting means 112 are located in a trap door with a locked access (for example with a key) located on the vehicle.

The vehicle 10 also comprises a charger 114 connected to the battery 106 and allowing the energy from the outside to be adapted to the needs of the load of said battery. The battery is intended to receive a direct current and the charger notably includes a direct current/direct current (DC/DC) converter 116 and an alternating current/direct current (AC/DC) converter 118 for allowing charging of the battery 106 from an energy source delivering an alternating current or a direct current.

It will also be noted that the vehicle comprises a variable speed drive 118 upstream from the motor 102 and notably placed between the interconnection means 108 and the motor. The variable speed drive notably comprises a DC/DC converter and is coupled with control means 119 able to communicate with other elements of the vehicle and to control the variable speed drive 118 depending on data received from these elements so that it delivers to the motor a voltage in connection with the mechanical power which is desired to be given to the vehicle.

The control means 109 of the interconnection means 108 and the control means 119 of the variable speed drive 118 are able to communicate, notably with the CAN bus of the vehicle 120, as well as with monitoring means 122, respectively 124, for the characteristics relating to the energy storage means 104, respectively 106.

The CAN bus 120 of the vehicle gives the possibility of obtaining data relating to units of the vehicle other than the storage means, for example to the speed of the vehicle, to a mechanical command from the user on the accelerator pedal, etc. The monitoring means 122, 124 give the possibility of obtaining data measured by said monitoring means 122, 124 relating to various parameters of the energy storage means 104, 106, such as the charge condition of the storage means, or detecting an operating fault of said storage means.

Thus, depending on the data from the CAN bus and from the monitoring means, it is possible to control as accurately as possible the interconnection means and the controller, for example by acting in the following way:

When the vehicle is at a stop, passing the interconnection means into the stopping position, when the charge level of the supercapacitor module is less than a low threshold level, passing the position of the interconnection means to the position connecting the battery to the motor, conversely, when the charge level of the supercapacitor module is greater than a high threshold level, passing the position of the interconnection means to the position connecting the supercapacitors to the motor, when the charge level of both storage means is below a threshold level, connecting the battery to the motor and controlling the variable speed drive so that a threshold voltage not to be exceeded is determined regardless of the request carried out by the user by means of the accelerator pedal, in order to limit unnecessary energy expenditure.

Of course it will be noted that information may be transmitted by the system described above to the CAN bus of the vehicle so that the user is alerted notably via the dashboard of the vehicle that the charge level of one or both storage means is low and that one of the storage means has a faulty operation.

It will also be noted that certain storage means of the vehicle at least, notably the supercapacitor module, and the associated connection means may be placed in an added roof box from which they may be connected to the elements already installed in the vehicle (such as the motor or the CAN bus). This facilitates maintenance of the portion allowing energy to be loaded and stored.

A station 200 will now be described in detail, allowing the stopping and the charging of the vehicle.

The station 200 is connected to at least one energy source: in the present case, it is connected to an external electric network 300 such as an urban electricity distribution network which provides energy as an alternating current on the one hand, and, to cells, notably photovoltaic panels 400 which may be located on the roof of the station or at a distance from the latter on the other hand and distribute energy as a direct current. A simpler version of the station may be connected to only one of these energy sources, notably to the distribution network 300.

The station 200 also comprises connection means, called third connection means 204, mating the first connection means 110, as well as fourth connecting means 204, mating the second connection means 112 of the vehicle. In the case when the third connection means are located at the end of a retractable arm, the third connecting means comprise a connector essentially located at the same height as the retractable arm. There again, it will be noted that the presence of the fourth connection means 204 is not indispensable. On the other hand, the presence of the third connecting means is required for allowing rapid recharging of the supercapacitors of the vehicle.

The station 200 also comprises energy storage means located in the station. In particular, it comprises third energy storage means, i.e. a supercapacitor module 206, electrically connected to the third connecting means, and fourth connecting means, i.e. a battery 208, electrically connected to the fourth connecting means 204.

Thus, it is possible to rapidly charge (between the passages at the station of two successive vehicles) the supercapacitor module 206 of the station 200 and rapidly discharge, in less than a minute, said module 206 for recharging the additional supercapacitor module 104 of the vehicle, connected to the module 206 of the station 200 via the first and third connecting means 110, 202 which are connected together.

The fourth storage means 208 are optional. They are however useful in the case when the station 200 is connected to an energy source which is not permanently available (photovoltaic panel type) as illustrated in FIG. 2. In this case, the battery 208 is located downstream from the photovoltaic panels 400 and allows the energy recovered by the panels to be stored for a long period. When a vehicle stops and connects via the second and fourth connection means in order to recharge its onboard battery 106, the energy stored in the battery 208 of the station is given back to the onboard battery 106.

The circuit which gives the possibility of charging the supercapacitor module 104 located in the vehicle at the station will now be described more specifically. This circuit comprises, as this has already been described, a supercapacitor module 206 connected to an urban electricity network 300 on the one hand and to third connection means on the other hand to which the vehicle is intended to be connected via the first connection means. In the present case, the circuit comprises, downstream from the connection with the network 300, an AC/DC converter 210, giving the possibility of transforming the electric energy distributed as an alternating current into electric energy as a direct current. The energy stored in the different storage means is actually stored as a DC current. This converter 210 is preferably located at the entry of the station so that the energy is directly available in DC form regardless of its subsequent destination.

The circuit for charging the onboard supercapacitor module 104 also comprises interconnection means 212, 214 which give the possibility of directing the energy from the urban network into the different branches of the circuit. The interconnection means 212 give the possibility of directing the energy to a first branch intended for charging the onboard supercapacitor module 104 of the vehicle and therefore connected to the third connection means 202 or alternatively to a second branch intended for charging the onboard battery 106 of the vehicle and therefore connected to the fourth connection means 112. The interconnection means 114 give the possibility of directing the energy from the converter 210 and circulating in the first branch, either directly to the third connection means 202 or to the supercapacitor module 206 of the station. They also give the possibility of electrically connecting the supercapacitor module 206 of the station 200 with the third connection means 202.

The charging circuit further comprises a DC/DC converter 216, interposed between the supercapacitor module 206 and the third connection means 202 for adapting the output voltage of the supercapacitor module 206 of the station to the voltage required by the supercapacitor module 104 of the vehicle. Preferably the converter 216 is located between the interconnection means 214 and the third connection means 202 so as to be able to treat with a single converter the energy from the supercapacitor module or directly from the electricity network. It will be noted that this converter has to be interposed between both supercapacitor modules, of the station and of the vehicle. It may also be placed in the vehicle.

The interconnection means 212, 214 are controlled by control means 218 able to communicate with these interconnection means and controlling their operation according to data which may come from different elements such as means 220, 222 for monitoring the different storage means 206, 208 of the station 200 and connection means 202, 204 of the latter. The monitoring means 220, 222 give the possibility of obtaining data relating to the parameters of the storage means (charge level, fault detection) and they are similar to those described in connection with the vehicle. The connection means allow simple detection of the plugging of a connector of the vehicle into that of the station or transmission of data from the vehicle for example via a guide wire. Such data may be those provided by the means 122 or 124 for monitoring the storage means 104, 106 of the vehicle, when the relevant storage means is connected to the station.

For charging the onboard supercapacitor module 104, the station may notably operate in the following way. When no connection of any vehicle is detected at the third connection means 202 of the station, the interconnection means 212 and 214 are with priority placed in a position allowing the energy from the distribution network 300 to be directly directed into the supercapacitor module 206 of the station. When a vehicle connects to the station, the third connection means 202 signal this, and the control means 218 order the interconnection means 214 to pass into a position which allows transmission of the energy stored in the supercapacitor module 206 of the station to the one of the vehicle. When the monitoring means 220 indicate that the charge level of the module 206 is less than a threshold level, and if the vehicle is still connected (or alternatively if the charge level of the supercapacitor module 104 of the vehicle is less than an upper threshold level indicating completion of the charging) the control means 218 order the interconnection means 214 to pass into a position allowing direct connection of the network 300 to the connection means 202.

The second branch of the circuit of the station for recharging the battery of the vehicle will now be described. As this has already been described, this branch comprises a battery 208 downstream from photovoltaic panels 400. The battery is on the other hand connected to the fourth connection means 204. The charging circuit of the battery further comprises a charger 224 interposed between the photovoltaic panels and the battery and notably including a DC/DC converter allowing optimization of the charging of the battery from the photovoltaic panels. The charger 224 may notably be of the MPPT (Maximum Power Point Tracking) type, that is to say that it detects which voltage is required so that the power provided by the photovoltaic panels is maximum and which voltage is then to be transferred to the battery so that the transmitted power is maximum.

The branch for charging the onboard battery of the vehicle also includes interconnection means 226 downstream from the battery. These means are interposed between the battery 208 and the interconnection means 204. They notably give the possibility of connecting to the fourth connection means either the battery 208, or the electricity distribution network 300. As described earlier, the interconnection means are controlled by control means 218, from data obtained from the monitoring means 220, 222 and from the connection means 202, 204.

In the present case, when the connection of the vehicle to the station is detected via the second and fourth connection means, the control means 218 control the interconnection means 226 so that the battery 208 is electrically connected to the battery 106 of the vehicle. When the monitoring means 222 indicate that the charge level of the battery is less than a low threshold level, the control means 218 control the interconnection means 212, 226 so that the battery 106 of the vehicle is directly connected to the distribution network, if the connection of the vehicle via the second and fourth connection means is always effective, or alternatively, if it is detected that the charge level of the battery 106 of the vehicle is not greater than an upper threshold level. Again connecting the battery 208 to the connection means may also be contemplated when its charge level again passes above a certain charge level.

It will be noted that in this case, the charger 114 interposed between the batteries 208 of the station and that 106 of the vehicle is located in the vehicle. It may however be set into place at the station, notably between the interconnection means 226 and the fourth connection means.

It will also be noted that in the case when the station comprises both a system for charging the supercapacitors of the vehicle and a system for charging the batteries of the vehicle, like in the example of the present application, these systems may be completely independent of each other and not communicate with each other.

The facility according to the invention operates in the following way:

When no vehicle is present in the station, the supercapacitor module 206 located in the station is charged from the urban network, the battery 208 of the station being also then charged if the supercapacitor module 206 has a charge level above a threshold level, When a vehicle arrives in a station, the driver positions it so that the arm comprising the first connection means 110 is substantially positioned facing the connection means 202, by means of visual marks and optionally of retarders and/or shims located at the roadway, The displacement of the arm is carried out when a sensor locates the presence of the connector 110 facing the arm and when the driver sends a command (for example, via the interface of the vehicle or a separate control means specific to the stations). The connection means 110 of the vehicle and 202 of the station are then connected.

As the connection is effective, the station detects it and controls the interconnection means 214 for transferring energy from the supercapacitor module 206 of the station to the supercapacitor module 104 of the vehicle. Preferentially, when the connection is effective, rolling of the vehicle is prevented (which is for example achieved by controlling the controller 118 and/or the interconnection means 108). Visual or audio signaling at the station or of the vehicle may also be provided for signaling the state of the connection, When it is detected that the threshold level of the supercapacitor module 104 of the vehicle is exceeded and/or upon a command from the driver (the two conditions may either be cumulative or not), the connector 110 of the vehicle is disconnected by retracting the connecting arm. When the arm is retracted, a condition detected for example by a presence sensor, rolling of the vehicle is again allowed. The cycle described above may then start again with the arrival of the next vehicle, When a vehicle uses a station for charging its battery 106, for example at night, the connector 112 of the vehicle is connected to the connector 204 of the station. The detection of the presence of the connector triggers a command to the interconnection means 212 for transferring energy from the urban network 300 and/or the storage means 208 into the battery of the vehicle. The connection between the station and the vehicle is then achieved manually. Means may also be provided for preventing rolling of the vehicle when the connection between the means 112, 204 is effective.

The facility described in FIG. 2 is a particular embodiment of the invention, which is not limited to this embodiment and to the alternatives mentioned in the description. Other alternatives may notably enter the scope of claim 1.

The invention claimed is:

1. An electric vehicle, comprising an electric motor and energy storage means onboard, electrically connected to the electric motor, in order to supply electric energy to said electric motor, wherein the energy storage means comprise:
   a first energy storage module comprising at least one supercapacitor,
   a second energy storage module comprising at least one battery,
   the first energy storage module and the second energy storage modules being laid out on parallel electrical branches, the vehicle comprising interconnection means, which are connected to the electric motor, to the first energy storage module and to the second energy storage module,
   wherein the interconnection means are positioned between the energy storage modules and the electric motor, wherein the interconnection means comprise a switch configured for having a first position connecting the first energy storage module to the electric motor and a second position connecting the second energy storage module to the electric motor,
   wherein the switch is configured so as not to allow both connections of the first energy storage module and of the second energy storage module to the electric motor,
   wherein the vehicle comprises:
      first connection means, capable of connecting the first storage module to additional connection means, located outside the vehicle,
      second connection means, which are distinct from the first connection means and which are capable of connecting the second energy storage module to additional connection means, located outside the vehicle.

2. The vehicle according to claim 1, at least comprising a DC/DC converter interposed between the second connection means and the second energy storage module.

3. The vehicle according to claim 1, comprising means for controlling the interconnection means, capable of controlling the interconnection means according to one or several of the following parameters:
   parameters related to the operation of the first and/or the second energy storage module,
   parameters related to the operation of the vehicle,
   a signal from a user interface.

4. The vehicle according to claim 3, wherein the means for controlling the interconnection means are able to communicate with one or several of the following elements:
   means for monitoring the first storage module,
   means for monitoring the second storage module,
   means for monitoring the other units of the vehicle.

5. The vehicle according to claim 1, comprising a DC/DC converter, interposed between the electric motor and at least one of the energy storage modules.

6. The vehicle according to claim 5, wherein said DC/DC converters operates as a variable speed drive, the vehicle also comprising means for controlling the variable speed drive, controlling the variable speed drive according to at least one parameter from the following list:
   parameters related to the operation of the first and/or the second energy storage module,
   parameters related to the operation of the vehicle,
   a signal from a user interface.

7. The vehicle according to claim 6, wherein the means for controlling the variable speed drive are able to communicate with one or several of the following elements:
   the means for monitoring the first energy storage module,
   the means for monitoring the second energy storage module,
   the means for monitoring the other units of the vehicle.

8. The vehicle according to claim 1, wherein the energy storage means are positioned in a roof box of the vehicle.

9. A transport facility, comprising:
   at least one vehicle according to any one of claims 1 or 2-8, and
   at least one station for recharging the vehicle positioned on a path of the vehicle and in the vicinity of which the vehicle is intended to stop, the station being connected to at least one energy source and including connection means, so-called third connection means mating the first connection means of the vehicle, and capable of electrically connecting said or one of the energy sources to the first energy storage module.

10. The facility according to claim 9, wherein the first connection means of the vehicle comprise an arm, which is telescopic and able to extend by protruding from the vehicle and comprising a connector at its end, the third connection means comprising a connector mating the one located at the end of the arm and positioned at the station so that both connectors of the vehicle and of the station may come into contact.

11. The facility according to claim 9, wherein said or at least one of the stations comprises energy storage means comprising at least one third storage module comprising one or several supercapacitors electrically connected to said or at least one of the energy sources on the one hand and to the third connection means on the other hand.

12. The facility according to claim 9, wherein said or at least one of the stations comprises at least one DC/DC converter interposed between the third storage module and the third connection means.

13. The facility according to claim 9, wherein said or at least one of the stations is electrically connected to an urban electricity distribution network forming said or one of the energy sources, and comprises an AC/DC converter interposed between the network and the third connection means.

14. The facility according to claim 9, wherein said or at least one of the stations comprises fourth connection means, distinct from the third connection means and mating the second connection means of the vehicle connected to the second energy storage module of the vehicle, capable of connecting said or one of the energy sources to the second energy storage module.

15. The facility according to claim 9, wherein said or at least one of the stations is connected to an autonomous energy source.

16. The facility according to claim 15, wherein said station(s) also comprise(s) a fourth storage module including at least one battery electrically connected to the autonomous energy source in order to store the energy from this source.

17. The vehicle according to claim 1, at least comprising an AC/DC converter interposed between the second connection means and the second energy storage module.

18. The vehicle of claim 3, wherein the parameters related to the operation of the first and/or the second energy storage module are the charge level.

19. The vehicle of claim 3, wherein the parameters related to the operation of the vehicle are the speed of the vehicle or the state of the electric motor.

20. The vehicle according to claim 4, wherein the means for monitoring the other units of the vehicle include the CAN bus of the vehicle.

21. The vehicle according to claim 4, wherein the means for monitoring the other units of the vehicle include the CAN bus of the vehicle.

22. The vehicle according to the claim 1, comprising a DC/DC converter, interposed between the interconnection means and the electric motor.

23. The vehicle of claim 7, wherein the parameters related to the operation of the first and/or the second energy storage module are the charge level.

24. The vehicle of claim 7, wherein the parameters related to the operation of the vehicle are the speed of the vehicle or the state of the electric motor.

25. The vehicle of claim 7, wherein the means for monitoring the other units of the vehicle include the CAN bus of the vehicle.

26. The vehicle of claim 8, wherein the energy storage means are added onto the vehicle.

27. The vehicle according to claim 1, wherein the switch is configured for having a third position in which neither the first energy storage module nor the second energy storage module is connected to the electric motor.

28. The facility according to claim 13, wherein the AC/DC converter interposed between the network and the third connection means is interposed between the network and the third storage module.

29. The facility according to claim 15, wherein the autonomous energy source is produced by photovoltaic panels.

30. The facility according to claim 16, wherein the at least one battery electrically connected to the autonomous energy source is electrically connected to the fourth connection means of the station.

* * * * *

UNITED STATES PATENT AND TRADEMARK OFFICE
CERTIFICATE OF CORRECTION

| | | |
|---|---|---|
| PATENT NO. | : 9,994,237 B2 | Page 1 of 1 |
| APPLICATION NO. | : 14/902794 | |
| DATED | : June 12, 2018 | |
| INVENTOR(S) | : Jean-Jacques Jestin, Christian Sellin and Yvon Le Paven | |

It is certified that error appears in the above-identified patent and that said Letters Patent is hereby corrected as shown below:

In the Claims

Claim 6, Column 13, Line 67, delete "converters" and replace it with --converter--.

Signed and Sealed this
Twenty-second Day of January, 2019

Andrei Iancu
*Director of the United States Patent and Trademark Office*